United States Patent [19]

Kaneda et al.

[11] Patent Number: 5,077,107

[45] Date of Patent: Dec. 31, 1991

[54] LINING MATERIAL FOR PIPELINES

[75] Inventors: Shigeo Kaneda, Yokohama; Akio Morinaga, Fujisawa; Hitoshi Saito, Suita; Masahiro Seshimo, Nishinomiya, all of Japan

[73] Assignees: Tokyo Gas Kabushiki Kaisha, Tokyo; Ashimori Kogyo Kabushiki Kaisha, Osaka, both of Japan

[21] Appl. No.: 364,421

[22] PCT Filed: Oct. 5, 1988

[86] PCT No.: PCT/JP88/01015

§ 371 Date: Jun. 5, 1989

§ 102(e) Date: Jun. 5, 1989

[87] PCT Pub. No.: WO89/02821

PCT Pub. Date: Apr. 6, 1989

[30] Foreign Application Priority Data

Oct. 5, 1987 [JP] Japan ................................ 62-251375
Nov. 12, 1987 [JP] Japan ................................ 62-286643

[51] Int. Cl.$^5$ .......................... B29C 27/16; B32B 7/00; F16L 11/00; F16L 55/18

[52] U.S. Cl. .................................. 428/36.1; 428/258; 138/125

[58] Field of Search ...................... 428/36.1, 36.2, 258; 138/125, 126

[56] References Cited

U.S. PATENT DOCUMENTS 4,684,556  8/1987  Ohtsuga et al. .................. 428/36.1

FOREIGN PATENT DOCUMENTS 56-8229    1/1981  Japan .
59-225920 12/1984  Japan .
59-225921 12/1984  Japan .

Primary Examiner—James J. Seidleck
Assistant Examiner—Charles R. Nold
Attorney, Agent, or Firm—Birch, Stewart, Kolasch & Birch

[57] ABSTRACT

A lining material adapted for lining the inner surface of pipelines for transferring various kinds of fluids such as city water, sewage, city gases and petroleum, etc., is characterized in that low elongation high tensile strength filament yarns are used as wefts forming tubular textile jackets laid in the lining material, or as the yarns forming a tubular fibrous member together with a tubular textile jacket. This characteristic feature provides enhanced earthquake resistance and shape retaining property against external pressures and limited expansion in diameter.

11 Claims, 4 Drawing Sheets

LINING MATERIAL FOR PIPELINES

FIELD OF THE INVENTION

The present invention relates to a lining material for lining the inner surface of pipelines, such as gas conduits, city water pipelines, sewage pipelines, pipelines for laying power transmission wires or telecommunication cables, and petroleum pipelines, etc., chiefly those buried in the ground, for the purpose of maintenance and repairs or reinforcement thereof.

DESCRIPTION OF THE PRIOR ART

In recent years, a method of applying a lining material onto the inner surface of various kinds of pipelines, such as city water pipelines, sewage pipelines, gas conduits, pipelines which accommodate power transmission cables or telecommunication cables and oil pipelines, etc., has been carried out for the purpose of maintenance and repairs or reinforcement of the pipelines when they are superannuated. The method of applying a lining material is carried out in such a manner that a tubular, flexible lining material whose inner surface has previously been coated with an adhesive is inserted into a pipeline and allowed to advance therein while turning the lining material inside out and pressing it against the inner surface of the pipeline under a fluid pressure, whereby adhesively bonding the inner surface of the lining material onto the inner surface of the pipeline. This method of application is advantageous in that there is no need for digging up pipelines already laid over the entire length thereof for the purpose of application of the liner, and the lining work can be done within a short period of time for a long pipeline and also can be applied even to a pipeline having a number of bends, thus attracting attention especially in recent years as an extremely excellent method.

A pipeline whose inner surface has been applied with a lining material is of a construction wherein another pipe formed by the lining material layer exists inside the outer pipe, i.e., so-called pipe-in-pipe construction, and therefore even when the outer pipe is damaged by the action of external forces, the inner pipe formed by the lining material layer is still intact and effective to prevent the leakage of the fluid contained therein, thereby ensuring that a flow path for the internal fluid is secured temporarily.

In such a case, it is required that the pipeline should have a satisfactory earthquake resistance property wherein even when the outer pipe is damaged by external forces, the inner pipe formed by the layer of the lining material applied to the inner surface of the outer pipe is not destroyed and still effective to prevent the leakage of the fluid therein. Thus, the main phenomena which take place in the event of the damage or breakdown of a pipeline include peripheral cracking and fracture of the pipe and detachment of pipe joints fitted thereto. Therefore it is required that the lining material should have sufficient strength in the longitudinal direction of the pipe and be able to exhibit an elongation of about 10 to 20%.

In case a pipeline is damaged by earthquake etc., external pressures such as underground water pressure and earth pressure act directly on the inner pipe formed by the lining material layer, and therefore it is required that the lining material should have sufficient strength to withstand the underground water pressure and the earth pressure; that is, a satisfactory shape retaining property against external pressures. This shape retaining property against external pressure contributes to a great degree to the circumferential bending modulus of elasticity of the lining material forming the inner pipe. Thus, the greater the bending modulus of elasticity, the better the shape retaining property of the above-mentioned inner pipe against external pressures.

Further, when a fluid under pressure is transported through the pipeline, it is required that the inner pipe formed by the lining material layer have strength enough to withstand the internal fluid pressure. Therefore, the coefficient of expansion in diameter of the inner pipe due to internal pressure should preferably be as small as possible. If the coefficient of expansion in diameter of the inner pipe is high, then further promotion of the damage of the outer pipe tends to take place.

Lining materials which have been used in the above-mentioned lining method, include those described, for example, in Japanese Laid-Open Patent Application No. SHO 56-8229, Japanese Laid-Open Utility Model Application No. SHO 56-3619, Japanese Laid-Open Patent Application Nos. SHO 59-225921 and 59-225920, etc.

In the lining materials as described in the above-mentioned Japanese Laid-Open Patent Application No. SHO 56-8229 and Japanese Laid-Open Utility Model Application No. SHO 56-3619, the tubular textile jacket forming part of the structure thereof is formed by ordinary synthetic fibers, and therefore a large expansion in diameter of the lining layer occurs when the lining is subjected to an internal pressure, thus creating a risk of increasing the degree of damage of the pipeline, and because of its poor shape retaining property against external pressures, there is a great possibility of the lining layer being crushed or ruptured by the action of the earth pressure.

The lining materials as described in Japanese Laid-Open Patent Application Nos. SHO 59-225921 and 59-225920 each comprise in combination a tubular textile jacket and a tubular unwoven fabric, or a knit fabric to ensure that a satisfactory shape retaining property of the lining layer against external pressures is obtained by increasing the thickness thereof, and to insure that the expansion in diameter of the lining layer is restrained thereby. However, these lining materials are disadvantageous in that complicated processes are required to manufacture them, and the large thickness of the lining layer renders the lining operation per se more difficult.

SUMMARY OF THE INVENTION

The present invention has been made in view of such actual circumstances in the prior art, and has for its object to provide a lining material for pipelines, which eliminates the need for increasing the thickness of the lining material layer beyond the thickness actually required and which meets the requirements of enhanced earthquake resistance, shape retaining property against external pressures and pressure resistance, and also a requirement that the expansion in diameter thereof when subjected to pressure be limited.

Seven embodiments of the lining material of the present invention will be described hereinafter. The terms "warp", "weft" and "low elongation high tensile strength fiber" used herein are defined as follows.

The term "warp" used for weaving the tubular textile jacket, which is described herein, is a yarn laid in the tubular textile jacket in the longitudinal direction thereof, whilst the term "weft" is a yarn laid in the tubular textile jacket in the circumferential direction thereof.

Further, the term "low elongation high tensile strength fiber" used herein is a fiber referred commonly to as "Super Fiber" or "High-Performance Fiber" or "High Tech Fiber", and examples thereof to be cited are metallic fiber, glass fiber, carbon fiber, aromatic polyamide fiber, aromatic polyester fiber, and ultra-high-polymerization polyethylene fiber, etc. The term "low elongation high tensile strength yarn" used herein refers to a yarn made of these fibers.

Glass fibers are obtained by subjecting glass to melt spinning, and examples thereof to be cited are E-glass fiber for general use (density: 2.54 g/cm$^3$, tensile strength: 350 kg/mm$^2$, tensile modulus: 7,400 kg/mm$^2$, ultimate elongation: 3.5%) and C-glass fiber having an improved acid resistance (density: 2.49 g/cm$^3$, tensile strength: 250 kg/mm$^2$, tensile modulus: 7,040 kg/mm$^2$, ultimate elongation: 4.2%).

Carbon fibers are produced by subjecting organic fibers to carbonization. Polyacrylonitrile series carbon fibers are produced from special grade PAN (polyacrylonitrile) series fibers as a raw material thereof and occupy the major proportion of the fibers being produced. The PAN series carbon fibers of a high tensile strength (HT) type exhibit, for example, a density of 1.80 g/cm$^3$, a tensile strength of 420 kg/mm$^2$, a tensile modulus of 24,000 kg/mm$^2$, and an ultimate elongation of 1.7%, whilst the same series carbon fibers of a high tensile (HM) type exhibit, for example, a density of 1.81 g/cm$^3$, a tensile strength of 250 kg/mm$^2$, a tensile modulus of 40,000 kg/mm$^2$ and an ultimate elongation of 0.6%.

"Aramid fibers" is a general term for fibers produced from wholly aromatic polyamide. Aramid is defined by the United States Federal Trade Commission as a synthetic fiber which contains, as a fiber forming substance, long-chain synthetic polyamide wherein at least 85% of amino links (—CO—NH—) are linked to two aromatic rings.

BRIEF DESCRIPTION OF THE DRAWINGS

The present invention can be more fully understood from the following description taken in conjunction with the accompanying drawings in which.

DETAILED DESCRIPTION OF THE INVENTION

The present invention provides a first lining material for pipelines as mentioned hereinbelow. The first lining material is a tubular liner adapted for use in a pipe lining method wherein a tubular lining material whose inner surface has previously been applied with an adhesive is inserted into a pipeline and allowed to advance therein while turning the lining material inside out and pressing the evaginated lining material against the inner surface of the pipeline by the action of a fluid pressure thereby adhesively bonding the lining material onto the inner surface of the pipeline by the aid of the adhesive interposed between the pipeline and the lining material, characterized in that it comprises a tubular textile jacket having an air impervious layer comprised of rubber or a synthetic resin bonded onto the outer surface thereof, and the tubular textile jacket is formed by weaving warps and weft. The warps consist of suitable synthetic fiber yarns, and all or some of the wefts are formed of low elongation high tensile strength filament yarns or alternatively each of which is formed partially of low elongation high tensile strength fibers. The warps are laid in the tubular textile jacket extending substantially straightly, and the wefts are laid therein extending in a bent configuration.

Figure 1:
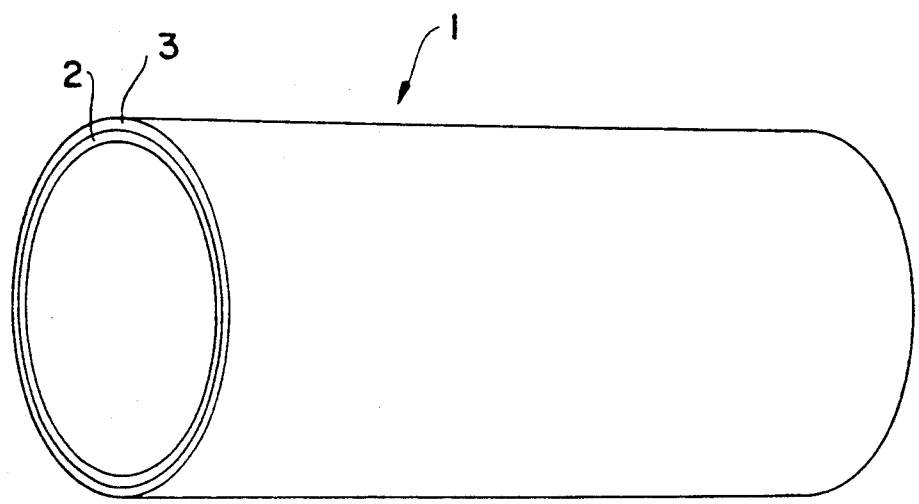
FIG. 1 is a perspective view of the first lining material.
Figure 2:
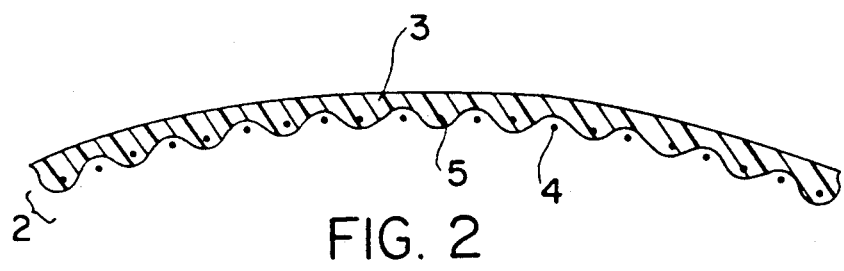
FIG. 2 is a cross-sectional, enlarged view showing schematically a portion of the first lining material.

The tubular textile jacket 2 used in the first lining material (Refer to FIGS. 1 and 2) is formed by weaving warps 4 and wefts 5 in a tubular shape, and polyester yarns are used as warps 4. Polyester yarns possess a chemical resistance, a tensile strength which is especially high among ordinary synthetic fiber yarns, and an ultimate elongation of ten percent or slightly more. Therefore, polyester yarns possess appropriate characteristic properties to provide earthquake resistance required for the above-mentioned lining material.

All or some of the wefts are formed of low elongation high tensile strength filament yarns, or each of the wefts is formed partially of low elongation high tensile strength fibers.

As for the wefts 5, low elongation high tensile strength filament yarns having Young's Modulus of 7,000 kg/mm$^2$ or more should preferably be used. If the Young's modulus of the fibers forming the wefts 5 were less than 7,000 kg/mm$^2$, then the bending modulus of elasticity of the lining material layer which is formed when the fibers are impregnated with a reaction-curing type resin would not become sufficiently high, thus resulting in inferior shape retaining property of the lining layer against external pressures.

Appropriate examples of the low elongation high tensile strength fibers include glass fiber, carbon fiber, Aramid fiber and metallic fiber, etc., with glass fiber being most suitable for forming the lining material. When lining material 1 is applied to the inner surface of a pipeline to form a lining layer, the tubular textile jacket 2 is impregnated with a reaction-curing type resin. As for this reaction-curing type resin, epoxy resin is used most commonly. Therefore, glass fibers, which have excellent affinity with this epoxy resin and which form a relatively low cost composite material with a high modulus of elasticity using epoxy resin as a matrix thereof, are suitable for use as the above-mentioned low elongation high tensile strength filament.

Further, it is preferable to use glass fibers whose filament diameter is 6 μm or under. The tubular textile jacket 2 for use in the lining material 1 is folded into a flattened state after it has been woven, and filament yarns each having a large filament diameter are not preferable because the fibers at the folded edges thereof are liable to be broken. Further, upon inserting this lining material into a pipeline while turning it inside out in order to apply the lining material onto the inner surface of the pipeline, if filament yarns each having a fine filament diameter are used, then the flexibility of the lining material becomes high so that it becomes possible to evaginate the lining material easily and proceed with the evagination under a low fluid pressure.

As for the low elongation high tensile strength filament yarns, those subjected to a bulking process should preferably be used. Since it is necessary to impregnate the tubular textile jacket 2 sufficiently with the reaction-curing type resin, it is desirable to use yarns obtained by disturbing untwisted low elongation high tensile strength filament yarns by air jet or steam jet to thereby entangle the filaments, and then subjecting them to bulking treatment.

The weft 5 can be formed by the above-mentioned low elongation high tensile strength filament yarns alone, but it is possible to form the wefts by intertwisting the low elongation high tensile strength filament yarns with yarns of other fibers, for example, polyester filament yarns or polyester twisted long filament yarns. In this case, the modulus of elasticity of the weft 5 will be reduced by a certain degree, however, the expansion in diameter of the lining material 1 during the lining process and adjustments of the adhesive bonding power of the wefts to the air-impervious layer 3 can be made easily.

When fiber-reinforced plastic (FRP) is formed using low elongation high tensile strength fibers, a pretreatment has been applied to the fibers in order to enhance the adhesive bonding power thereof to the matrix. For example, glass fibers are subjected to silane coupling treatment. However, even with glass fibers which have been subjected to such treatment, it is difficult to enhance the adhesive bonding power thereof to the flexible air-impervious layer 3.

In order to enhance the adhesive bonding power between the tubular textile jacket 2 and the air impervious layer 3, it is preferable to use low elongation high tensile strength filament yarns in combination with polyester twisted long filament yarns.

Further, wefts 5 formed only of low elongation high tensile strength filament yarns are used, the adhesion between the tubular textile jacket 2 and the air-impervious layer 3 can be enhanced by using polyester twisted long filament yarns or polyester spun yarns for some of the above-mentioned warps 4.

In the tubular textile jacket 2 of the first lining material formed by weaving warps 4 and wefts 5 in a tubular shape, the warps 4 are of substantially rectilinear construction and the wefts 5 are of a bent configuration. The degree of bends of the wefts 5 should adequately be set at such a value to ensure that the crimp percentage of the wefts 5 laid in the above-mentioned tubular textile jacket is in the range of 7 to 25%.

As for the method of weaving the tubular textile jacket 2, any suitable method such as plain weave, twill weave or rib weave, etc. can be used.

As for the material forming the air impervious layer 3 of the above-mentioned lining material 1, various kinds of materials are properly selected depending on the kind of a pipeline to be lined, and any one of those of excellent durability is used depending on the conditions, such as the kind of fluid to be passed through the pipeline and the temperature thereof, etc. Commonly used materials include thermoplastic polyester elastic resin, thermoplastic polyurethane elastic resin, and polyolefin series resin, etc.

When the first lining material is applied to the inner surface of a pipeline, because the wefts 5 laid in the tubular textile jacket 2 are of a bent configuration, when the bent portions of the wefts 5 are straightened, it is possible to cause an expansion in diameter of the lining material thus making it possible to apply the lining material onto the inner surface of the pipeline.

Thus, in the event of failure or breakdown of the pipeline either by an earthquake or by vibration, since the warps 4 laid in the tubular textile jacket 2 are formed of polyester fiber yarns, the lining layer surrounding a broken part in the outer pipe is peeled off or detached from the pipeline and extends so that the lining layer itself can be prevented from damage and maintained in a pipe configuration thus rendering it possible to maintain a passageway for the fluid flowing therethrough.

Further, since the wefts 5 laid in the tubular textile jacket 2 are formed by low elongation high tensile strength fibers, the inner pipe made of the lining layer formed by the lining material can withstand the internal fluid pressure when the pipeline is damaged, and is not subjected to excessive expansion in diameter.

Further, in the condition that the tubular textile jacket 2 is impregnated with a reaction-curing type resin and solidified to form a lining layer, since the wefts 5 comprised of low elongation high tensile strength fibers are used, the bending modulus of elasticity of the lining layer in the circumferential direction is high, and so the inner pipe is not broken by a buckling load due to external pressure. Therefore, the inner pipe can provide an excellent shape retaining property against external pressures.

Accordingly, the first lining material can meet all the performance requirements for the above-mentioned lining material for pipelines such as enhanced earthquake resistance and shape retaining property against external pressures, and also meet the requirement that the expansion in the diameter thereof should be limited. Further, these requirements can be met without having to increase the thickness of the lining layer beyond the required value, and therefore the fibrous layer of the lining material 1 consists only of a single tubular textile jacket 2 and can be manufactured readily, and also the lining operation can be carried out easily under a low fluid pressure.

Furthermore, in the first lining material, the wefts 5 laid in the tubular textile jacket 2 are of bent configuration, and therefore even if low elongation high tensile strength filament yarns which are subjected to little elongation are used as the wefts 5, a predetermined expansion in diameter of the lining layer required for lining operation can be secured so that the lining material can be applied properly onto the inner surface of the pipeline.

Further, when low elongation high tensile strength filament yarns whose filament diameter is 6 μm or under are used as the wefts 5, the resultant tubular textile jacket 2 becomes extremely flexible and there is no possibility of the wefts being broken when they are folded during the weaving process, etc. Further, since slipping among fibers is liable to occur, it is possible to cause a proper expansion in diameter of the lining layer in the lining process thus making it easier to apply the lining material on and along the inner surface of a pipeline.

Further, the use of low elongation high tensile strength filament yarns treated with a bulking process will increase the amount of the reaction-curing type adhesive with which the tubular textile jacket is to be impregnated, so a lining layer having a sufficient thickness can be secured. Further, the adhesive bonding power between the tubular textile jacket 2 and the air impervious layer 3 can be enhanced by using in combination polyester twisted long filament yarns and low elongation high tensile strength filament yarns for the wefts 5.

According to the present invention, there is provided a second lining material which is a tubular liner adapted for use in the above-mentioned pipe lining method, characterized in that it comprises a tubular textile jacket formed by weaving warps consisting of suitable synthetic fiber yarns and wefts, all or some of which are formed of low elongation high tensile strength filament yarns or alternatively each of which is formed partially of low elongation high tensile strength fibers, and yarns which are sufficiently thicker than the wefts forming the tubular textile jacket being laid on the inner surface of the textile jacket, the thicker yarns being fastened to the tubular textile jacket at very wide intervals and forming a fibrous layer together with the tubular textile jacket, said tubular textile jacket having an air impervious layer comprising rubber or a synthetic resin bonded onto the outer surface thereof.

Figure 3:
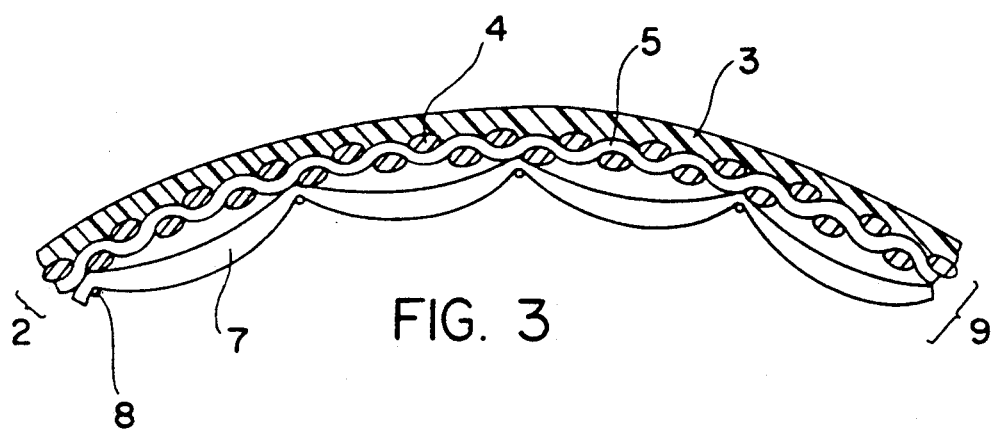
FIG. 3 is a cross-sectional view showing schematically a portion of the second lining material.

This second lining material (Refer to FIG. 3) has the following construction. The tubular textile jacket 2 used in this lining material is formed by weaving warps 4 and wefts 5 in a tubular shape. As for the warps 4, ordinary synthetic fiber yarns such as polyester yarns and nylon yarns, etc. are used. In particular, the polyester yarns possess a chemical resistance, a tensile strength which is especially high among ordinary synthetic fiber yarns, and an ultimate elongation of ten percent or slightly more. Therefore, these yarns possess adequate characteristics required to exhibit a satisfactory earthquake resistance for the lining material. Further, in order to enhance the adhesive bonding power between the tubular textile jacket 2 and the air-impervious layer 3, all or some of the warps 4 should preferably consist of twisted long filament yarns.

Further, all or some of the wefts 5 are formed of low elongation high tensile strength filament yarns or alternatively each of the wefts 5 is formed partially of low elongation high tensile strength fibers. As in the case of the aforementioned first lining material, materials suitable for the low elongation high tensile strength fibers are, for example, glass fiber and Aramid fiber.

In terms of the tensile strength of the lining material, all of the wefts 5 laid in the tubular textile jacket 2 should be formed of low elongation high tensile strength filament yarns. However, it is possible to use low elongation high tensile strength filament yarns for some of the wefts 5 and synthetic fiber yarns such as polyester fiber yarns for the remainder of the wefts 5.

Further, it is possible to use in combination the low elongation high tensile strength filament yarns and ordinary synthetic fiber yarns as the wefts 5 in order to form a tubular textile jacket 2, and after the formation of the latter, to subject the synthetic fiber yarns to heat shrinkage so as to cause slack in the low elongation high tensile strength filament yarns so that the lining material may expand properly in diameter and adhesively bond onto the inner surface of a pipeline under a fluid pressure during the lining process thereby completing the lining operation without causing any wrinkle in the lining material.

In this second lining material, yarns 7 which are sufficiently thicker than the above-mentioned wefts 5 are laid on the inside of the above-mentioned tubular jacket 2 in the circumferential direction thereof. The yarns 7 are fastened to the tubular textile jacket 2 by means of fastening yarns 8 at very wide intervals and fixedly secured to the tubular textile jacket 2.

The above-mentioned yarns 7 may be laid in the longitudinal direction of the tubular textile jacket 2.

The fastening yarns 8 may be yarns separate from the warps 4 forming the above-mentioned tubular textile jacket 2, but the warps 4 forming the tubular textile jacket may serve concurrently as the fastening yarns to fasten the yarns 7.

The yarns 7 may be fastened to the tubular textile jacket 2 at very wide intervals, preferably at intervals of several centimeters. Regarding the positions where each of the yarns 7 is fastened to the tubular textile jacket 2, it is preferable that the fastening positions of adjacent yarns 7 are not aligned in the longitudinal direction of the lining material, but at staggered positions in the longitudinal direction so as to avoid the formation of continuous recesses at the fastening points along a straight line in the longitudinal direction of the tubular textile jacket.

The second lining material can meet, in the same manner as the first lining material, all the performance requirements for the lining material for pipelines, such as enhanced earthquake resistance and shape retaining property against external pressures, and also a requirement that the expansion in diameter of the lining layer should be limited. Further, since the yarns 7 laid in this lining material are fastened to the inner surface of the tubular textile jacket 2 at very wide intervals, even when a multiplicity of yarns 7 are used, the resultant lining material is very flexible and can be handled easily, and also the evagination of the lining material can be made easily when it is inserted into a pipeline while turning it inside out. Therefore, the lining material can be inserted into the pipeline while turning it inside out by the action of a low fluid pressure.

Further, if yarns treated by a bulking process are used as the yarns 7, then the quantity of the reaction-curing type resin with which the lining layer is to be impregnated can be increased to thereby enable the lining layer having a required thickness to be secured. Further, the adhesive bonding power between the fibrous layer 9 and the air-impervious layer 3 can be enhanced by using in combination of polyester filament yarns and polyester spun yarns or polyester twisted long filament yarns as the warps 4 to be laid in the tubular textile jacket 2.

Further, according to the present invention, there is provided a third lining material for pipelines, characterized in that a tubular fibrous member is fitted in the tubular textile jacket in the second lining material; that is; on the side of the inner surface of the tubular textile jacket adapted to be bonded onto the inner surface of a pipeline during lining operation so that the tubular fibrous member and said tubular textile jacket may form a fibrous layer, said tubular textile jacket having an air impervious layer comprising rubber or a synthetic resin bonded onto the outer surface thereof.

Figure 4:
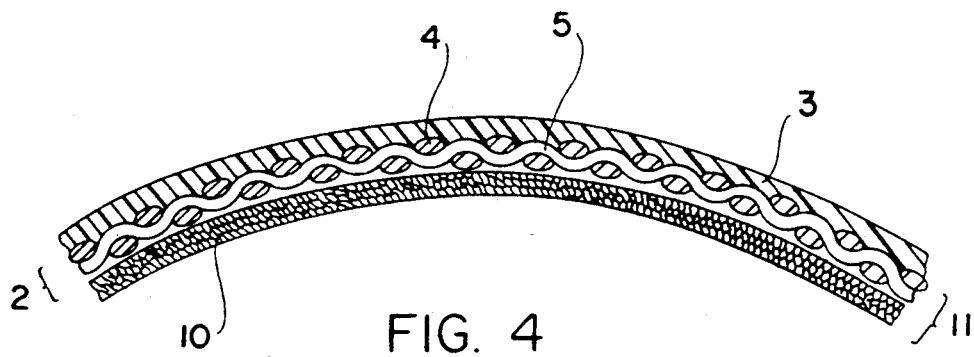
FIG. 4 is a cross-sectional view showing schematically a portion of the third lining material.

This third lining material (Refer to FIG. 4) comprises a tubular fiber member 10 fitted in the above-mentioned tubular textile jacket 2 so that the tubular fibrous member 10 and the tubular textile jacket 2 may form a fibrous layer 11, and the arrangement is made such that when the lining material is evaginated the inner surface of the tubular member 10 is adhesively bonded to the inner surface of the pipeline, and after the pipeline has been lined the outer surface of the above-mentioned air-impervious layer 3 is allowed to contact with a fluid flowing through the pipeline.

As for this tubular fiber member 10, a tubular woven fabric or a thick tubular fabric or a tubular member formed by superposing the unwoven fabric on the thick tubular fabric as an integral unit are suitable.

In this third lining material, the thickness of the tubular fibrous member 10 can be set at any desired value, and therefore by adjusting the thickness thereof the quantity of retention of the reaction-curing type resin as a curing agent with which the fibrous member is to be impregnated can be adjusted so that a lining material suitable for the kind of pipeline to be lined and the installing condition can be prepared.

According to the present invention, there is provided a fourth lining material adapted for use in the above-mentioned lining method, characterized in that it comprises a tubular textile jacket formed by weaving warps and wefts in a tubular shape, and low elongation high tensile strength filament yarns, said low elongation high tensile strength filament yarns being laid on the inner surface of the tubular textile jacket in the circumferential direction thereof, and also being fastened to the tubular textile jacket at very wide intervals, the low elongation high tensile strength filament yarns being allowed to slack between the adjoining fastening points so that the low elongation high tensile strength filament yarns and the tubular textile jacket may form a tubular fibrous member, said tubular textile jacket in the tubular fibrous member having an air impervious layer comprised of rubber or a synthetic resin bonded onto the outer surface thereof.

This fourth lining material (Refer to FIG. 5) is characterized in that the above-mentioned low elongation high tensile strength filament yarns 12 are laid on the inside of the above-mentioned tubular textile jacket 2'; that is to say; on the surface of the textile jacket 2' adapted to be adhesively bonded onto the inner surface of a pipeline in the circumferential direction thereof, the low elongation high tensile strength filament yarns 12 are fastened to the tubular textile jacket 2' at very wide intervals, and each of the low elongation high tensile filament yarns 12 is allowed to slack between the adjoining fastening points thereby forming a tubular fibrous member 13. The above-mentioned low elongation high tensile strength filament yarns 12 laid in this fourth lining material has slackened portions formed between the adjoining points thereof fastened by the fastening yarns 8.

As in the case of the second lining material, the warps 4 forming the tubular textile jacket 2' may serve concurrently as the fastening yarns 8, however, yarns separate from the warps 4 may be used as fastening yarns.

As for the warps 4 and the wefts 5' forming the above-mentioned tubular textile jacket 2', ordinary yarns such as polyester yarns or nylon yarns, etc. may be used. In order that the tubular textile jacket 2' may exhibit a satisfactory earthquake resistance, polyester yarns having a high tensile strength and an ultimate elongation of ten percent or slightly more should preferably be used. Further, as for the wefts 5', high tensile strength yarns such as glass fiber yarns and aromatic polyamide fiber yarns may be used.

In order to enhance the adhesive bonding power between the tubular textile jacket 2' and the air impervious layer 3, as for at least either the warps 4 or the wefts 5', yarns formed by intertwisting polyester filament yarns with polyester spun yarns or polyester twisted long filament yarns should preferably be used.

The thickness and weave density of these warps 4 and wefts 5' vary with the diameter or bore of the pipeline to be lined and the purpose of use. However, it is preferable to form the tubular textile jacket 2' by densely weaving yarns having a thickness in the range of 500 to 5,000 d.

The method of weaving the tubular textile jacket 2' is not limited to a particular method, and a proper weaving method such as plain weave and twill weave, etc. may be used.

As for the above-mentioned high tensile strength yarns 12, yarns which are sufficiently thicker than the wefts 5' forming the tubular textile jacket 2' should preferably be used.

In case the inner surface of a pipeline is applied with this lining material to form a lining layer, the tubular fibrous member 13 is impregnated with a reaction-curing type resin. In this case, epoxy resin is used most commonly as the reaction-curing type resin.

Accordingly, glass fibers which have excellent affinity with epoxy resin and which are capable of forming a composite material having a high modulus of elasticity using epoxy resin as a matrix thereof are suitable for the material for the lining material.

The thickness of the high tensile strength yarns 12 varies with the required degree of shape retaining property against external-pressures. It is adequate that a layer having a thickness of 2 to 10 mm is formed by the high tensile strength yarns 12 on the inner surface of the tubular textile jacket 2'. Further, it is preferable to use bulky yarns as the high tensile strength yarns 12, because the use of bulky yarns increases the apparent thickness thereof and makes it easier to impregnate them with large quantities of the reaction-curing type resin. Air jet method and steam jet method are known methods of bulking treatment.

Further, the high tensile strength yarns 12 should preferably be laid on the inner surface of the tubular textile jacket 2' with a considerable density, and at least in no-load condition, more than 50% of the inner surface of the tubular textile jacket 2' should desirably be covered with the high tensile strength yarns 12. If the rate of covering the tubular textile jacket 2' with the yarns 12 is low, the portions of the tubular textile jacket 2' which are not covered with the yarns 12 cannot be impregnated with the reaction-curing type resin, thus lowering the rate of impregnation of the lining material with the resin, and therefore the shape retaining property of the lining material against external pressures cannot be enhanced sufficiently.

The high tensile strength yarns 12 should preferably be fastened to the tubular textile jacket 2' at very wide intervals. It is proper to fasten the high tensile strength yarns 12 to the textile jacket 2' at intervals of several centimeters. Regarding fastening points of the yarns 12, it is preferable to fasten the adjoining high strength yarns 12 at staggered positions with one another in the longitudinal direction of the lining material so as to avoid alignment of the fastening points of the adjoining yarns 12 thereby reducing the unevenness in the thickness of the fibrous layer at the fastening points.

Figure 5:
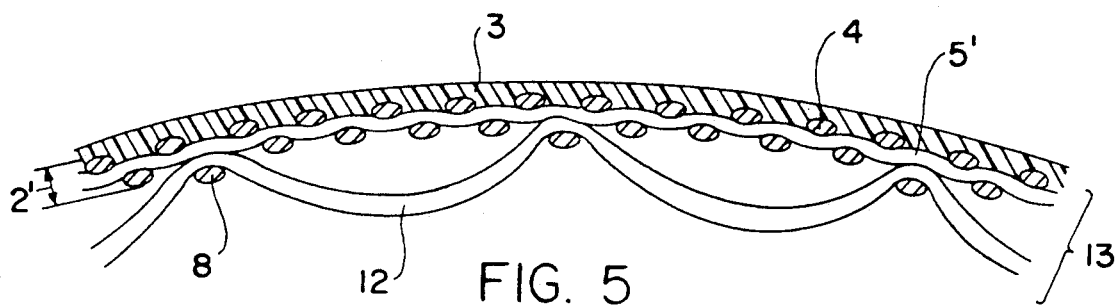
FIG. 5 is a cross-sectional view showing schematically a portion of the fourth lining material.

As shown in FIG. 5, the high tensile strength yarn 12 has slackened portions formed between the adjoining fastening points. The lining material shown in FIG. 5 comprises a tubular fibrous member 13 having an air impervious layer 3 formed or bonded on the outer surface thereof. This lining material is inserted into a pipeline while turning it inside out so as to line the inner surface of the pipeline. When the lining material is turned inside out, the high tensile strength yarns 12 are located outside of the tubular textile jacket 2'. Therefore, if the high tensile strength yarns 12 have no slackened portions, then upon evagination of the lining material, the tubular textile jacket 2' will wrinkle or because of the high rigidity of the high tensile strength yarns 12 it becomes impossible to cause a required expansion in diameter of the lining material, thereby rendering it difficult to bond the lining material onto the inner surface of the pipeline.

The material of the air impervious layer 3 in the lining material is the same as that of the air impervious layer formed in each of the above-mentioned lining materials.

When this fourth lining material is manufactured, a tubular textile jacket 2' is formed by weaving warps 4 and wefts 5', and low elongation high tensile strength filament yarns 12 are laid along the inner surface of the tubular textile jacket 2' adapted to be located opposite to the inner surface of the pipeline and in the circumferential direction thereof, and also the high tensile strength yarns 12 are fastened by fastening yarns 8 at wide intervals, thereby forming a tubular fibrous member 13. In that case, the diameter of the tubular fibrous member 13 is woven so as to have a diameter somewhat larger than that of the required diameter of the lining material, whilst the high tensile strength yarns 12 are woven while being applied with a tension required for weaving operation without causing any slack.

Subsequently, when this tubular fibrous member 13 is pulled in the longitudinal direction thereof, the wefts 5' laid in the tubular textile jacket 2' will bend and shrink diametrally, and the high tensile strength yarns 12 will become loose. Then, an air impervious layer 3 is formed on the outer surface of the tubular fibrous member 13 by using a suitable method such as an extrusion molding process. When this lining material is applied to the inner surface of a pipeline, the diameter of the tubular textile jacket 2' of the tubular fibrous member 13 can be expanded relatively easily because it is made up of a fabric. And also, since the high tensile strength yarns 12 have slackened portions, the expansion in diameter of the tubular textile jacket 2' is not impeded by the high tensile strength yarns 12 so that the lining material can be expanded properly by the action of a fluid pressure, and the high tensile strength yarns 12 can be pressed against and bonded to the inner surface of the pipeline substantially without any slack.

Since, when the lining material has been inserted into a pipeline, a large number of high tensile strength yarns 12 are laid on the surface of the lining material adapted to be located opposite to the inner surface of the pipeline, and are fastened to the tubular textile jacket 2' at very wide intervals while they extend in a slackened state on the surface of the tubular textile jacket 2', the high tensile strength yarns 12 can be impregnated with large quantities of the reaction-curing type resin. Therefore, after the completion of lining operation, a pipe of FRP construction having a sufficient thickness and which is reinforced with high tensile strength yarns 12 will be formed inside the pipeline.

The high tensile strength yarns 12 serve to prevent the lining material from being excessively expanded in diameter by the internal fluid pressure when the main pipeline is damaged or broken.

In this lining material, when the tubular fibrous member 13 has been impregnated with the reaction-curing type resin and has solidified to form a lining layer, large quantities of high tensile strength yarns 12 are laid circumferentially of the lining layer, and therefore the lining layer has a high circumferential bending modulus of elasticity so that there is no fear of the lining layer being subjected to buckling by the external pressures. Accordingly, this lining material is excellent in the above-mentioned shape retaining property against external pressures.

In this fourth lining material, since the high tensile strength yarns 12 are not woven in the tubular textile jacket 2', but laid in a slackened state on the surface thereof, the shape retaining property of the lining material can be enhanced without increasing the thickness of the tubular textile jacket 2'.

Further, since the high tensile strength yarns 12 are laid in a slackened state on the surface of the tubular textile jacket 2', when this lining material is folded, there is no fear of the high tensile strength yarns 12 being broken at the folded edges thereof. Further, the use of sufficiently thick high tensile strength yarns 12 provides a lining material having a high degree of shape retaining property.

Further, since the high tensile strength yarns 12 are fastened in a slackened state onto the surface of the tubular textile jacket 2', even when a large quantity of high tensile strength yarns 12 are used, the resultant lining material is very flexible and can be handled easily, and also when the lining material is inserted into a pipeline while turning it inside out, the evagination thereof can be made easily so that it can be turned readily inside out by a low fluid pressure.

If and when bulky yarns are used as the high tensile strength yarns 12, upon effecting lining operation, the amount of the reaction-curing type resin with which the lining material is to be impregnated can be increased and a required thickness of the lining layer can be secured.

According to the present invention, there is provided a fifth lining material adapted for use in the above-mentioned lining method, characterized in that it comprises a first tubular textile jacket in the above-mentioned fourth lining material having an air impervious layer comprised of rubber or a synthetic resin bonded onto the outer surface thereof, and a second tubular textile jacket formed by weaving wefts and warps in a tubular shape, said wefts in the second textile jacket consisting of low elongation high tensile strength filament yarns and being laid in such a manner that it extends substantially without any slack, said second tubular textile jacket being fitted loosely in said first tubular textile jacket.

Figure 6:
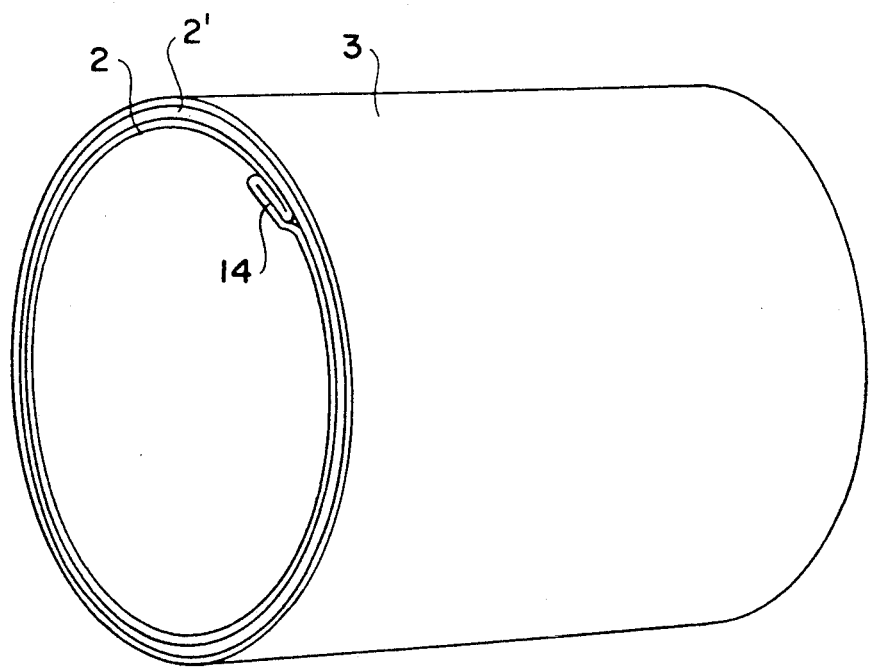
FIG. 6 is a perspective view of the fifth lining material.
Figure 7:
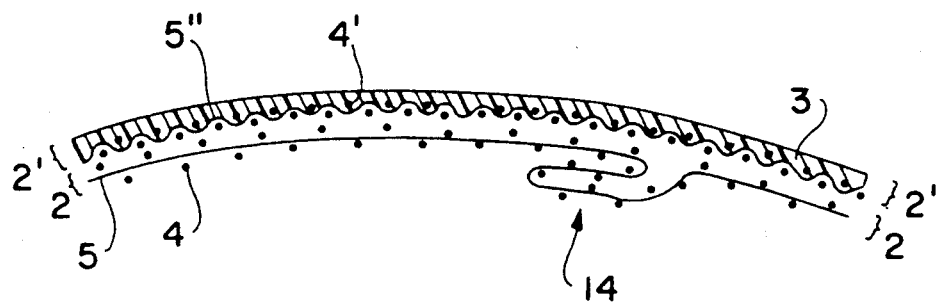
FIG. 7 is a cross-sectional view showing schematically a portion of the fifth lining material.

This fifth lining material (Refer to FIGS. 6 and 7) is constructed such that the above-mentioned second tubular textile jacket 2 is fitted in the first or outer tubular textile jacket 2', and the outer tubular textile jacket 2' has an air impervious layer 3 comprised of rubber or a synthetic resin bonded onto the outer surface thereof.

The above-mentioned outer tubular textile jacket 2' is formed by weaving warps 4' and wefts 5" in a tubular shape and has the above-mentioned air impervious layer 3 bonded onto the outer surface thereof.

Further, the above-mentioned inner tubular textile jacket 2 is also formed by weaving warps 4 and wefts 5 in a tubular shape, and as for the wefts 5, low elongation high tensile strength filament yarns such as glass fiber yarns are used and laid substantially without any slack. As for the wefts 5, glass fiber yarns treated by a bulking process should preferably be used. As for the warps 4, any suitable synthetic fiber yarns such as polyester yarns can be used.

This inner tubular textile jacket 2 is fitted loosely in the outer tubular textile jacket 2', and a part thereof forms a folded portion 14.

Figure 8:
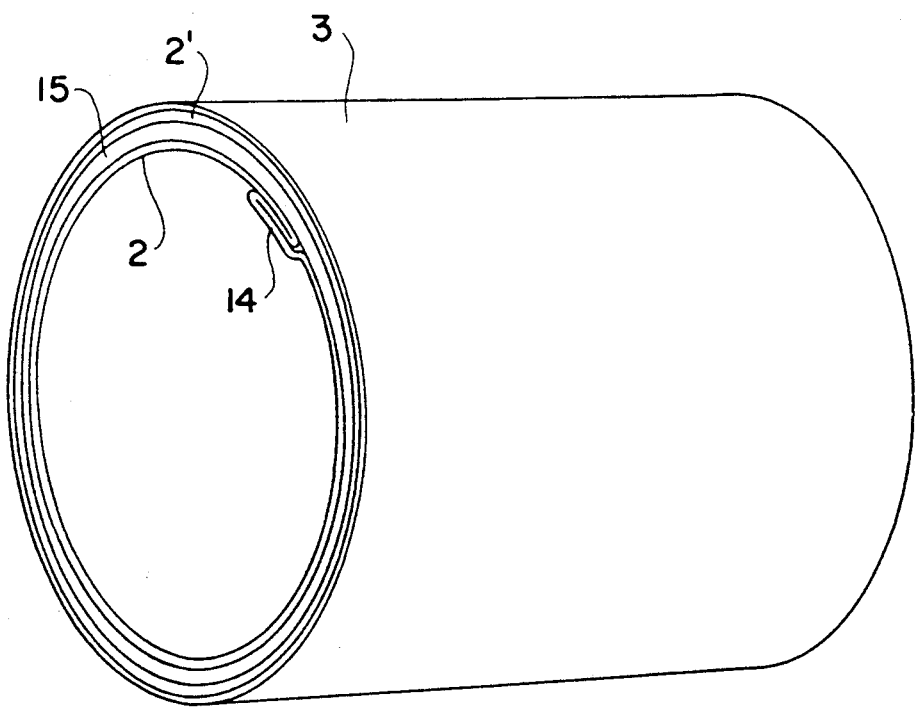
FIG. 8 is a perspective view of the sixth lining material.
Figure 9:
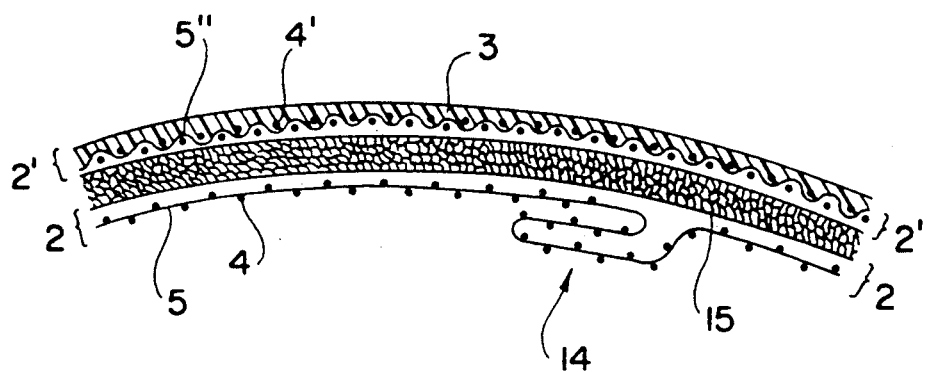
FIG. 9 is a cross-sectional view showing schematically a portion of the sixth lining material.

Further, according to the present invention, there is provided a sixth lining material. The sixth lining material (Refer to FIGS. 8 and 9) is constructed such that the above-mentioned first tubular textile jacket 2' has an air impervious layer 3 comprising rubber or a synthetic resin bonded onto the outer surface thereof, and a tubular unwoven fabric 15 is fitted in the first tubular textile jacket 2', and further the above-mentioned second tubular textile jacket 2 is fitted in the tubular unwoven fabric 15.

In the same manner as the tubular textile jackets in the case of the fourth and fifth lining material, the above-mentioned first tubular textile jacket 2'; that is; the outer tubular textile jacket is formed by weaving warps 4' and wefts 5" in a tubular shape and has the aforementioned air impervious layer 3 formed or bonded onto the outer surface thereof.

As for the tubular unwoven fabric 15, an unwoven fabric made up of synthetic fiber yarns such as polyester yarns, etc. can be used, and also an unwoven fabric made up of low elongation high tensile strength fiber yarns such as glass fiber yarns, etc., may be used. Further, as for this unwoven fabric 15, either a tubular molded unwoven fabric or a tubular unwoven fabric which is formed by rounding a sheet of unwoven fabric and joining both edges thereof can be used.

Further, the above-mentioned inner tubular textile jacket 2 is also formed by weaving warps 4 and wefts 5 in a tubular shape, and as for the wefts 5, low elongation high tensile strength yarns such as glass fiber yarns, etc., are used and laid substantially without any slack. As for the wefts 5, glass fiber yarns which have been subjected to bulking treatment should preferably be used. As for the warps 4, suitable synthetic fiber yarns such as polyester yarns, etc. can be used.

This inner tubular textile jacket 2 is fitted loosely in the tubular unwoven fabric 15, and a part thereof forms a folded portion 14.

In both cases of the fifth and sixth lining materials, as for the warps 4' and wefts 5" laid in the above-mentioned outer tubular textile jacket 2', ordinary synthetic fiber yarns such as polyester yarns and nylon yarns, etc., can be used. However, in order that the lining material may exhibit a satisfactory earthquake resistance, polyester yarns having a high tensile strength and an ultimate elongation of about ten percent or slightly more should preferably be used.

Further, as for the wefts 5", low elongation high tensile strength filament yarns such as those made up of glass fiber yarns and aromatic polyamide filament yarns, etc. can also be used.

Further, as for at least either one of the warps 4' or wefts 5", yarns formed by intertwisting polyester yarns with polyester spun yarns or polyester twisted long filament yarns should preferably be used in order to improve the adhesive bonding power between the outer tubular textile jacket 2' and the air impervious layer 3.

The thicknesses and weave densities of these warps 4' and the wefts 5" vary with the bore of a pipeline to be lined and the purpose of use. However, it is generally preferable to form the outer tubular textile jacket 2' by densely weaving yarns having a thickness in the range of about 500 to 5,000 d.

The inner tubular textile jacket 2 laid in the fifth and sixth lining materials according to the present invention will now be described. As for the wefts 5 laid in this tubular textile jacket 2, low elongation high tensile strength filament yarns are used. As for the wefts 5, yarns which are sufficiently thicker than the wefts 5" laid in the outer tubular textile jacket 2' should preferably be used.

When the inner surface of a pipeline is applied with this lining material to form a lining layer, the inner tubular textile jacket 2 is impregnated with a reaction-curing type resin. As for the reaction-curing type resin, epoxy resin and unsaturated polyester resin are used most commonly. Therefore, as for the wefts 5 used in the inner tubular textile jacket 2, glass fiber yarns which are excellent in affinity with epoxy resin or unsaturated polyester resin and which are capable of forming a composite material having a high modulus of elasticity by using such a resin as a matrix thereof should preferably be used.

Further, the thickness of the wefts 5 varies with the required degree of shape retaining property of the lining layer against external pressures, but should preferably be sufficiently thicker than that of the weft 5" laid in the outer tubular textile jacket 2' in order to ensure that the inner tubular textile jacket 2 having a thickness of about 2 to 10 mm is formed. Further, it is preferable to use bulky yarns as the wefts 5, because the apparent thickness of the wefts 5 is increased and it becomes easier to impregnate the wefts with large quantities of the reaction-curing type resin. As for the method of bulking treatment, air jet method and steam jet method are known.

As for the warps 4 laid in the inner tubular textile jacket 2, ordinary synthetic fiber yarns such as polyester yarns and nylon yarns, etc., can be used, and also yarns identical to the warps 4' laid in the outer tubular textile jacket 2' may be used.

Further, the wefts 5 should preferably be laid substantially without any slack and at a considerable density. At least in no-load condition, more than 50% of the inner surface of the lining material should desirably be covered with the wefts 5. If the rate of covering the lining material with the wefts 5 is low, then the portions of the lining material which are not covered with the wefts 5 cannot be impregnated with the reaction-curing type resin thus lowering the content of the resin in the lining material and rendering it impossible to enhance the shape retaining property of the lining material sufficiently.

Further, the warps 4 should preferably be laid at intervals of spacing much wider than that of the warps 4' laid in the outer tubular textile jacket 2'. By so doing, the circumferential spacing of each of the wefts 5 between the adjoining warps 4 becomes wide, and so the portions of the wefts 5 between the adjoining warps 4 can be impregnated with large quantities of reaction-curing type resin.

In the fifth lining material, in order to give the lining material a satisfactory shape retaining property against external pressures, it is possible to increase or decrease the thickness of the lining material by adjusting the thickness of the wefts 5 laid in the inner tubular textile jacket 2. However, in case of lining materials to be applied to pipelines of large diameters, it is impossible to obtain a thickness enough to provide a satisfactory shape retaining property against external pressures only by increasing the thickness of the wefts 5 laid in the inner tubular textile jacket 2. In such a case, the sixth lining material is used and a tubular unwoven fabric 15 is laid between the outer tubular textile jacket 2' and the inner tubular textile jacket 2 so that the thickness of the lining material can be increased and a satisfactory shape retaining property against external pressures can be secured.

Further, according to the present invention, there is further provided the following seventh lining material. That is to say; the seventh lining material is a liner adapted for use in the above-mentioned lining method, characterized in that it comprises a tubular textile jacket having an air impervious layer comprising rubber or a synthetic resin bonded onto the outer surface thereof, said tubular textile jacket being formed of a multi-ply woven fabric and the wefts laid in the inner ply of the woven fabric; that is, the wefts on the side of the inner surface of the tubular textile jacket are adapted to be bonded onto the inner surface of a pipeline in the lined condition consisting of low elongation high tensile strength filament yarns.

The seventh lining material (Refer to FIG. 10) comprises a tubular textile jacket 6 formed by weaving warps and wefts, said tubular textile jacket 6 having an air impervious layer 3 comprising rubber or a synthetic resin bonded onto the outer surface thereof. On the side of the inner surface of the tubular textile jacket adapted to be bonded to the inner surface of a pipeline to be lined, said tubular textile jacket 6 is formed of a multi-ply woven fabric, and wefts 16 are laid in the inner ply of the multi-ply woven fabric. These wefts on the side of the inner surface of the tubular textile jacket adapted to be bonded onto the inner surface of a pipeline in the lined condition consist of low elongation high tensile strength filament yarns.

Figure 10:
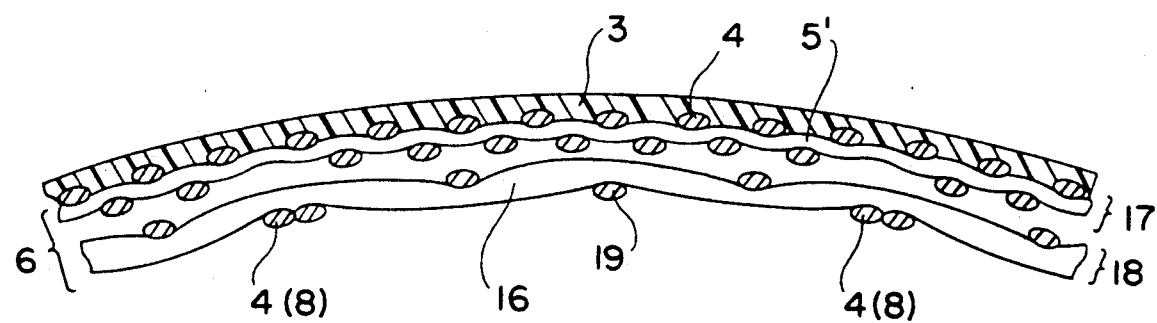
FIG. 10 is a cross-sectional view showing schematically a portion of the seventh lining material.

This tubular textile jacket 6 is formed by a multiply woven fabric (an example of two-ply woven fabric is shown in FIG. 10). Out of the multi-ply woven fabric, the outer woven fabric 17 thereof has the aforementioned air impervious layer 3 bonded onto the outer surface thereof. The outer woven fabric 17 is formed by weaving warps 4 and wefts 5' in a tubular shape. Further, in the inner woven fabric 18, low elongation high tensile strength filament yarns are used as wefts 16 thereof. The inner woven fabric 18 is woven more coarsely than the outer woven fabric 17. The inner woven fabric 18 is fastened to the outer woven fabric 17 by means of fastening yarns 8. In the example shown in FIG. 10, the yarns for fastening the inner woven fabric 18 are denoted with reference numeral 4(8). This implies that the warps 4 forming the outer woven fabric 17 are used as the fastening yarns 8. Unlike this example, fastening yarns separate from the warps 4 may be used independently to fasten the inner woven fabric 18 to the outer woven fabric 17.

As for the warps 4 and the wefts 5' for use in the above-mentioned outer woven fabric 17, ordinary synthetic fiber yarns such as polyester yarns and nylon yarns, etc., can be used. However, in order that the lining material may exhibit a satisfactory earthquake resistance, polyester yarns having a high tensile strength and an ultimate elongation of about ten percent or slightly more should preferably be used.

As for the wefts 5', low elongation high tensile strength filament yarns such as glass fiber yarns and aromatic polyamide fiber yarns, etc. may also be used. Further, as for at least either one of the warps 4 or the wefts 5', in order to enhance the adhesive bonding power between the outer woven fabric 17 and the air impervious layer 3, yarns formed by intertwisting polyester filament yarns with polyester spun yarns or polyester twisted long filament yarns should preferably be used.

The thicknesses and weave densities of these warps 4 and wefts 5' vary with the bore of a pipeline to be lined and the purpose of use. However, it is generally preferable to form the outer woven fabric 17 by densely weaving yarns having a thickness in the range of 500 to 5,000 d.

Next, the inner woven fabric 18 will be described. As for the wefts 16 to be laid in the inner woven fabric 18, high tensile strength yarns are used generally. As for the wefts 16, yarns which are sufficiently thicker than the wefts 5' forming the outer woven fabric 17 should preferably be used.

When this lining material is applied to the inner surface of a pipeline is applied to form a lining layer, the tubular textile jacket 6 is impregnated with a reaction-curing type resin. As for this reaction-curing type resin, epoxy resin and unsaturated polyester resin are used most commonly. Accordingly, as for the wefts 16 to be laid in the inner woven fabric 18, glass fiber yarns which have excellent affinity with epoxy resin and unsaturated polyester resin and which are capable of forming a composite material having a high modulus of elasticity by using such a resin as the matrix thereof should preferably be used.

Further, the thickness of the wefts 16 varies with the required degree of shape retaining property of the lining layer against external pressures. However, the thickness of the wefts 16 should adequately be such a magnitude as to ensure that the thickness of the inner woven fabric 18 becomes about 2 to 10 mm. Further, it is preferable to use bulky yarns as the wefts 16 because the apparent thickness of the wefts 16 can be increased, thus making it easier to impregnate the wefts with large quantities of the reaction-curing type resin. Known bulking treatment processes are the air jet method and the steam jet method.

As for warps 19 to be laid in the inner fabric 18, ordinary synthetic fiber yarns such as polyester yarns and nylon yarns, etc., can be used, and also yarns identical to the warps 4 for use in the outer woven fabric 17 may be used.

Further, the wefts 16 should preferably be laid at a considerable density on the inner surface of the outer woven fabric 17. At least in no-load condition, more than 50% of the inner surface of the outer woven fabric 17 should desirably be covered with the wefts 16. If the covering rate with the wefts 16 is low, then the portions of the outer woven fabric 17 between the adjoining wefts 16 cannot be impregnated with the reaction-curing type resin, thus lowering the content of the resin in the lining material and making it impossible to enhance sufficiently the shape retaining property of the lining layer against external pressures.

Further, the warps 19 should preferably be laid at much wider intervals than those of the warps 4 laid in the outer woven fabric 17. By such an arrangement, the portions of the wefts 16 between the adjoining warps 19 become long and can be impregnated with large quantities of the reaction-curing type resin.

Forming the inner woven fabric 18 and the outer woven fabric 17 is not limited to a particular method, and a suitable weaving method such as plain weave and twill weave, etc. can be used.

As in the cases of the above-mentioned first through sixth lining materials, the material of the air impervious layer 3 in this lining material is selected depending on the kind of a pipeline to be lined and the kind of the fluid to flow therethrough, and any one having excellent durability is used. Commonly used, in particular, are thermoplastic polyester elastic resin, thermoplastic polyurethane elastic resin and polyolefin series resin, etc.

In FIG. 10, the tubular textile jacket 6 is shown as comprising a double structure formed by the outer woven fabric 17 and the inner woven fabric 18. It is possible, however, to locate intermediate woven fabrics between these two woven fabrics 17 and 18 so as to form a multi-ply woven fabric structure having three or more layers. In the innermost woven fabric in the multi-ply woven fabric structure, the one forming the surface adapted to be adhesively bonded to the inner surface of a pipeline in the lined condition, low elongation high tensile strength filament yarns are used as the wefts thereof.

This seventh lining material can meet the requirements for the above-mentioned lining material for pipelines such as enhanced earthquake resistance and shape retaining property against external pressures and also the requirement that the expansion in diameter thereof should be limited. Furthermore, the use of the above-mentioned structure enables the formation of a lining layer having a satisfactory shape retaining property against external pressures without having to increase the thickness of the woven fabric 17 bonded to the air impervious layer and those of the intermediate woven fabrics beyond the required values. Further, since the above-mentioned low elongation high tensile strength filament yarns can be made sufficiently thick, a lining layer having a high degree of shape retaining property against external pressures can be obtained.

Further, because of the reduction in weave density of the warps 19 laid in the inner woven fabric 18, the portions of the wefts 16 each consisting of high tensile strength yarn between the adjoining fastening yarns on the surface of the outer woven fabric 17 become long so that even when large quantities of high tensile strength yarns are used the resultant lining material is very flexible and can be handled easily. When the lining material is inserted into a pipeline while turning it inside out, the lining material can be evaginated easily and the evagination thereof can be effected simply under a low fluid pressure.

Further, by using high tensile strength yarns treated by a bulking process as the wefts 16 for use in the inner woven fabric 18, the quantity of the reaction-curing type resin with which the inner woven fabric is to be impregnated can be increased, thereby securing a required thickness of the lining material. Further, by using in combination polyester filament yarns and polyester spun yarns or polyester twisted long filament yarns as the wefts 5' in the outer woven fabric 17, the adhesive bonding power between the tubular textile jacket 6 and the air impervious layer 3 can be enhanced.

In each of the tubular textile jackets used in the above-mentioned first through seventh lining materials, when highly flexible yarns are used as the warps forming the textile jacket a superior lining material can be provided. That is to say; as for such highly flexible yarns for use as the warps, elastic yarns such as polyurethane elastic yarns, etc., coiled with synthetic fiber yarns can be used. Alternatively, synthetic fibers treated by a crimping process may be used. Further, as for the fibers which are highly flexible per se, polybutylene terephthalate fibers can also be used, and polybutylene terephthalate fiber yarns treated by a crimping process are most suitable for this purpose.

As for the above-mentioned elastic yarns, besides polyurethane elastic yarns, rubber yarns, etc., may be used. However, since rubber yarns are liable to deteriorate by ultra-violet rays or by heat, polyurethane elastic yarns are more suitable. Further, the synthetic fiber yarns to be coiled around the elastic yarns serve to enhance the shrinkage of the warps, and so, besides filament yarns and spun yarns of synthetic fibers, crimped synthetic fiber yarns can be used.

Further, as for the warps, it is preferable to use polybutylene terephthalate fiber yarns. Polybutylene terephthalate fiber yarns per se possess an ultimate elongation of about 30% and are especially highly flexible among synthetic fiber yarns and so are suitable as the above-mentioned warps. Further, by using polybutylene terephthalate fiber yarns treated by a crimping process, the flexibility of the lining material can be enhanced thereby providing a more preferable lining material.

Examples of the present invention will now be described below.

EXAMPLE 1

This is an example of the first lining material.

A lining material to be applied to a pipeline having a nominal diameter of 150 mm was produced as follows.

As for the warps for use in a tubular textile jacket to be produced, 240 lengths of double-yarns each being formed by four twisted polyester filament yarns having a thickness of 1,100 d were used. As for the wefts thereof, 62 lengths of filament yarns of glass fibers having a thickness of about 6,000 d were picked up over a span of 10 centimeters so as to weave a tubular textile jacket. An air impervious layer comprising thermoplastic polyester elastic resin was formed on the outer surface of the textile tubular jacket.

The results of various kinds of tests conducted on the lining material thus obtained are shown in TABLE 1 (1) and (2).

TABLE 1

| (1) Tubular Textile Jacket | |
| --- | --- |
| Weight of fibrous layer (g/m) | 410 |
| Thickness of fibrous layer (mm) | 1.0 |
| Longitudinal strength (kg/cm) | 290 |
| Transverse strength (kg/cm) | 163 |
| Breaking pressure (kg/cm$^2$) | 14.0 |
| Width of tubular textile jacket in flattened state (mm) | 230 |
| Width of tubular textile jacket when subjected to heat treatment to contract the width in flattened state (mm) | 230 |

TABLE 1

| (2) Lining Material | | | |
|---|---|---|---|
| Expansion in diameter of lining material when subjected to pressures indicated in the right column (cm, %) | 0.0 kg/cm² | 144 | 0 |
| | 1.0 kg/cm² | 163 | 13 |
| | 2.0 kg/cm² | 172 | 19 |
| | 3.0 kg/cm² | 172 | 19 |
| | 4.0 kg/cm² | 172 | 19 |
| | 5.0 kg/cm² | 172 | 19 |
| | 6.0 kg/cm² | 172 | 19 |
| Weight (g/m) | | 710 | |
| Width in flattened state (mm) | | 224 | |
| Thickness (mm) | | 1.5 | |
| Weight of lining layer (g/m) NOTE 1 | | 1140 | |
| Weight of adhesive (g/m) | | 430 | |
| Pressure at which buckling occurs (kg/cm²) NOTE 2 | | 0.2 | |
| Expansion in diameter of lining layer when subjected to pressures indicated in the right column (cm, %) NOTE 3 | 0.5 kg/cm² | 146 | 0 |
| | 1.0 kg/cm² | 168 | 15 |
| | 2.0 kg/cm² | 168 | 15 |
| | 3.0 kg/cm² | 168 | 15 |
| | 4.0 kg/cm² | 168 | 15 |
| | 5.0 kg/cm² | 168 | 15 |
| | 6.0 kg/cm² | 168 | 15 |

NOTE 1: Weight of a tubular member obtained by impregnating a lining material used alone with an adhesive.
NOTE 2: Pressure at which buckling of a pipe consisting of the lining layer formed by the lining material applied to the inner surface of a main pipe occurs when hydrostatic pressure is applied from a T-shaped branched pipe to the lining layer after the main pipe has been lined
NOTE 3: Measurements were made on the tubular member Re. NOTE 1.

EXAMPLE 2

This is an example of the second lining material.

A lining material to be applied to a pipeline having a nominal diameter of 150 mm was produced as follows.

As for the warps for use in a tubular textile jacket to be produced, 240 lengths of double-yarns each being formed by four twisted polyester filament yarns having a thickness of 1,100 d were used. As for the wefts thereof, 39 lengths of filament yarns of glass fibers having a thickness of about 6,000 d were picked up for a span of 10 centimeters so as to form a tubular textile jacket using plain weave method.

Subsequently, bulky yarns each being made up of eight twisted nylon yarns having a thickness of 1,700 d treated by a bulking process were used and laid spirally at a rate of 13 lengths over a span of 10 centimeters inside of the tubular textile jacket, and the bulky yarns were fastened by the warps six lengths apart so as to form a fibrous layer.

An air impervious layer comprising thermoplastic polyester elastic resin was formed on the outer surface of the fibrous layer thus obtained.

The results of various kinds of tests conducted on the thus produced lining material are shown in TABLE 2 (1) and (2).

TABLE 2

| (1) Fibrous Layer | |
|---|---|
| Weight of fibrous layer (g/m) | 440 |
| Thickness of fibrous layer (mm) | 2.5 |
| Longitudinal strength (kg/cm) | 290 |
| Transverse strength (kg/cm) | 85 |
| Breaking pressure (kg/cm²) | 6.5 |
| Width of fibrous layer in flattened state (mm) | 230 |
| Width of fibrous layer when subjected to heat treatment to contract the width in flattened state (mm) | 230 |

TABLE 2

| (2) Lining Material | | | |
|---|---|---|---|
| Expansion in diameter of lining material when subjected to pressures indicated in the right column (cm, %) | 0.0 kg/cm² | 144 | 0 |
| | 1.0 kg/cm² | 165 | 15 |
| | 2.0 kg/cm² | 172 | 19 |
| | 3.0 kg/cm² | 172 | 19 |
| | 4.0 kg/cm² | 172 | 19 |
| | 5.0 kg/cm² | 172 | 19 |
| | 6.0 kg/cm² | — | — |
| Weight (g/m) | | 740 | |
| Width in flattened state (mm) | | 224 | |
| Thickness (mm) | | 3.0 | |
| Weight of lining layer (g/m) NOTE 1 | | 1620 | |
| Weight of adhesive (g/m) | | 880 | |
| Pressure at which buckling occurs (kg/cm²) NOTE 2 | | 2.1 | |
| Expansion in diameter of lining layer when subjected to pressures indicated in the right column (cm, %) NOTE 3 | 0.5 kg/cm² | 146 | 0 |
| | 1.0 kg/cm² | 168 | 15 |
| | 2.0 kg/cm² | 168 | 15 |
| | 3.0 kg/cm² | 168 | 15 |
| | 4.0 kg/cm² | 168 | 15 |
| | 5.0 kg/cm² | 168 | 15 |
| | 6.0 kg/cm² | 168 | 15 |

NOTES 1-3: same as TABLE 1

EXAMPLE 3

This is an example of the fourth lining material.

A lining material to be applied to a pipeline having a nominal diameter of 150 mm was produced as follows.

As for the warps for use in a tubular textile jacket to be produced, 240 lengths of double-yarns each being formed by four twisted polyester filament yarns having a thickness of 1,100 d were used. As for the wefts thereof, 39 lengths of yarns each being formed by intertwisting one length of polyester filament yarn having a thickness of 1,100 d with 6 lengths of polyester spun yarns with 20 yarn count number were picked up over a span of 10 centimeters so as to form a tubular textile jacket using plain weave method.

Subsequently, bulky yarns each being formed by four twisted glass fiber yarns having a thickness of about 8,000 d treated by a bulking process were laid spirally at a rate of 13 lengths over a span of 10 centimeters inside of the tubular textile jacket, and the bulky yarns were fastened by the warps six lengths apart so as to form a fibrous layer.

Then, an air impervious layer comprising thermoplastic polyester elastic resin was formed on the outer surface of the fibrous layer thus obtained.

The results of various kinds of tests made on the lining material thus obtained are shown in TABLE 3 (1) and (2).

TABLE 3

| (1) Fibrous Layer | |
|---|---|
| Weight of fibrous layer (g/m) | 470 |
| Thickness of fibrous layer (mm) | 2.5 |
| Longitudinal strength (kg/cm) | 294 |
| Transverse strength (kg/cm) | 55.5 |
| Breaking pressure (kg/cm²) | 6.0 |
| Width of fibrous layer in flattened state (mm) | 239 |
| Width of fibrous layer when subjected to heat treatment to contract the width in flattened state (mm) | 230 |

TABLE 3

| (2) Lining Material | | | |
|---|---|---|---|
| Expansion in diameter of lining material | 0.0 kg/cm² | 144 | 0 |
| | 1.0 kg/cm² | 168 | 17 |

TABLE 3-continued

| (2) Lining Material | | | |
|---|---|---|---|
| when subjected to pressures indicated in the right column (cm, %) | 2.0 kg/cm² | 172 | 19 |
| | 3.0 kg/cm² | 172 | 19 |
| | 4.0 kg/cm² | 172 | 19 |
| | 5.0 kg/cm² | 172 | 19 |
| | 6.0 kg/cm² | — | — |
| Weight (g/m) | | 770 | |
| Width in flattened state (mm) | | 224 | |
| Thickness (mm) | | 3.0 | |
| Weight of lining layer (g/m) NOTE 1 | | 1650 | |
| Weight of adhesive (g/m) | | 880 | |
| Pressure at which buckling occurs (kg/cm²) NOTE 2 | | 3.0 | |
| Expansion in diameter of lining layer when subjected to pressures indicated in the right column (cm, %) NOTE 3 | 0.5 kg/cm² | 146 | 0 |
| | 1.0 kg/cm² | 168 | 15 |
| | 2.0 kg/cm² | 168 | 15 |
| | 3.0 kg/cm² | 168 | 15 |
| | 4.0 kg/cm² | 168 | 15 |
| | 5.0 kg/cm² | 168 | 15 |
| | 6.0 kg/cm² | 168 | 15 |

NOTES 1-3: same as TABLE 1

COMPARATIVE EXAMPLE 1

As a comparative example, a lining material to be applied to a pipeline having a nominal diameter of 150 mm was produced as follows.

As for the warps for use in a tubular textile jacket to be produced, 240 lengths of double-yarns each being formed by four twisted polyester filament yarns having a thickness of 1,100 d were used, whilst as for the wefts thereof, 62 lengths of yarns each being formed by intertwisting one length of polyester filament yarns having a thickness of 1,100 d with 6 lengths of polyester spun yarns with 20 yarn count number were picked up over a span of 10 centimeters so as to form a tubular textile jacket. Thereafter, an air impervious layer comprised of thermoplastic polyester elastic resin was formed on the outer surface of the tubular textile jacket.

The results of various kinds of tests made on the lining material thus obtained are shown in TABLE 4 (1) and (2).

TABLE 4

| (1) Tubular Textile Jacket | |
|---|---|
| Weight of fibrous layer (g/m) | 380 |
| Thickness of fibrous layer (mm) | 1.0 |
| Longitudinal strength (kg/cm) | 289 |
| Transverse strength (kg/cm) | 90.6 |
| Breaking pressure (kg/cm²) | 8.0 |
| Width of tubular textile jacket in flattened state (mm) | 245 |
| Width of tubular textile jacket when subjected to heat treatment to contract the width in flattened state (mm) | 230 |

TABLE 4

| (2) Lining Material | | | |
|---|---|---|---|
| Expansion in diameter of lining material when subjected to pressures indicated in the right column (cm, %) | 0.0 kg/cm² | 144 | 0 |
| | 1.0 kg/cm² | 151 | 5 |
| | 2.0 kg/cm² | 157 | 9 |
| | 3.0 kg/cm² | 173 | 20 |
| | 4.0 kg/cm² | 175 | 22 |
| | 5.0 kg/cm² | 178 | 24 |
| | 6.0 kg/cm² | 180 | 25 |
| Weight (g/m) | | 680 | |
| Width in flattened state (mm) | | 224 | |
| Thickness (mm) | | 1.5 | |
| Weight of lining layer (g/m) NOTE 1 | | 1110 | |
| Weight of adhesive (g/m) | | 430 | |
| Pressure at which buckling occurs (kg/cm²) NOTE 2 | | 0.05 | |
| Expansion in diameter of lining layer when subjected to pressures indicated in the right column (cm, %) NOTE 3 | 0.5 kg/cm² | 146 | 0 |
| | 1.0 kg/cm² | 147 | 1 |
| | 2.0 kg/cm² | 156 | 7 |
| | 3.0 kg/cm² | 169 | 16 |
| | 4.0 kg/cm² | 175 | 20 |
| | 5.0 kg/cm² | 178 | 22 |
| | 6.0 kg/cm² | 180 | 23 |

NOTES 1-3: same as TABLE 1

COMPARATIVE EXAMPLE 2

As another comparative example, a lining material to be applied to a pipeline having a nominal diameter of 150 mm was produced as follows.

As for the warps for use in a tubular textile jacket to be produced, 240 lengths of double-yarns each being formed by four twisted polyester filament yarns having a thickness of 1,100 d were used. As for the wefts thereof, 39 lengths of yarns each being formed by intertwisting one length of polyester filament yarn having a thickness of 1,100 d with 6 lengths of polyester spun yarns with 20 yarn count number were picked up over a span of 10 centimeters so as to form a tubular textile jacket using plain weave method.

Subsequently, bulky yarns each being formed by eight twisted nylon yarns having a thickness of 1,700 d treated by a bulking process were laid spirally at a rate of 13 lengths over a span of 10 centimeters inside of the tubular textile jacket, and the bulky yarns were fastened by the above-mentioned warps six lengths apart so as to form a fibrous layer.

Then, an air impervious layer comprising thermoplastic polyester elastic resin was formed on the outer surface of the fibrous layer thus produced.

The results of various kinds of tests made on the lining material thus obtained are shown in TABLE 5 (1) and (2).

TABLE 5

| (1) Fibrous Layer | |
|---|---|
| Weight of fibrous layer (g/m) | 440 |
| Thickness of fibrous layer (mm) | 2.5 |
| Longitudinal strength (kg/cm) | 289 |
| Transverse strength (kg/cm) | 45.5 |
| Breaking pressure (kg/cm²) | 4.2 |
| Width of fibrous layer in flattened state (mm) | 239 |
| Width of fibrous layer when subjected to heat treatment to contract the width in flattened state (mm) | 230 |

TABLE 5

| (2) Lining Material | | | |
|---|---|---|---|
| Expansion in diameter of lining material when subjected to pressures indicated in the right column (cm, %) | 0.0 kg/cm² | 144 | 0 |
| | 1.0 kg/cm² | 165 | 15 |
| | 2.0 kg/cm² | 172 | 19 |
| | 3.0 kg/cm² | 180 | 23 |
| | 4.0 kg/cm² | — | — |
| | 5.0 kg/cm² | — | — |
| | 6.0 kg/cm² | — | — |
| Weight (g/m) | | 740 | |
| Width in flattened state (mm) | | 224 | |
| Thickness (mm) | | 3.0 | |
| Weight of lining layer (g/m) NOTE 1 | | 1620 | |
| Weight of adhesive (g/m) | | 880 | |
| Pressure at which buckling occurs (kg/cm²) NOTE 2 | | 1.7 | |
| Expansion in diameter | 0.5 kg/cm² | 146 | 0 |

TABLE 5-continued

| (2) Lining Material | | | |
|---|---|---|---|
| of lining layer when subjected to pressures indicated in the right column (cm, %) NOTE 3 | 1.0 kg/cm² | 160 | 10 |
| | 2.0 kg/cm² | 169 | 16 |
| | 3.0 kg/cm² | 180 | 23 |
| | 4.0 kg/cm² | — | — |
| | 5.0 kg/cm² | — | — |
| | 6.0 kg/cm² | — | — |

NOTES 1-3: same as TABLE 1

What we claim is:

1. A lining material for use in a pipe comprising:
   a tubular textile jacket;
   an air impervious layer of rubber or other synthetic resin bonded onto an outer surface of said jacket;
   said tubular textile jacket formed by weaving warps and wefts, said warps formed of synthetic fiber yarns and
   (1) all of said wefts formed solely of low elongation high tensile strength filament yarns, or
   (2) some of said wefts formed solely of low elongation high tensile strength filament yarns, or
   (3) all of said wefts formed of low elongation high tensile strength filament yarns intertwisted with other fibers;
   said warps laid in the tubular textile jacket longitudinally with respect to said jacket and laid substantially straightly;
   said wefts woven with said warps by being laid in a bent configuration; said warps and wefts being woven such that, when said jacket is turned inside out for insertion into a pipe, an expansion in diameter of said jacket is possible when bent portions of said wefts become straightened.

2. The lining material of claim 1, wherein said wefts extend in a bent configuration such that a crimp percentage of said wefts laid in said tubular textile jacket is in a range of 7 to 25%.

3. The lining material of claim 1, further comprising yarns which are thicker than said wefts, said yarns being laid on an inner surface of said textile jacket, said yarns being fastened to said jacket at very wide intervals and forming a fibrous layer together with said jacket.

4. The lining material of claim 1, further comprising a tubular fibrous member being fitted inside of said tubular textile jacket such that said tubular fibrous member and said tubular textile jacket form a fibrous layer.

5. The lining material of claim 4 wherein said tubular fibrous member is formed of an unwoven fabric.

6. The lining material of claim 4 wherein said tubular fibrous member is formed of a tubular textile fabric.

7. The lining material as claimed in any one of claims 1 through 6, wherein said warps are formed of highly flexible yarns.

8. The lining material as claimed in any one of claims 1 through 6, wherein said low elongation high tensile strength filament yarns are filament yarns of glass fibers whose filament diameter is 6 μm or less.

9. The lining material as claimed in any one of claims 1 through 6, wherein said low elongation high tensile strength filament yarns are bulky yarns.

10. The lining material as claimed in any one of claims 1 through 6, wherein said warps are formed of polyester filament yarns and polyester twisted long filament yarns or polyester spun yarns.

11. A pipe lined with a tubular lining material comprising:
    a pipe having an inner surface;
    a tubular lining material having an inner and an outer surface;
    said lining being installed in said pipe by turning said lining inside out such that said inner surface of the lining contacts said inner surface of said pipe; said lining comprising:
    a tubular textile jacket;
    an air impervious layer of rubber or other synthetic resin bonded onto an outer surface of said jacket;
    said tubular textile jacket formed by weaving warps and wefts, said warps formed of synthetic fiber yarns and
    (1) all of said wefts formed solely of low elongation high tensile strength filament yarns, or
    (2) some of said wefts formed solely of low elongation high tensile strength filament yarns, or
    (3) all of said wefts formed of low elongation high tensile strength filament yarns intertwisted with other fibers;
    said warps laid in the tubular textile jacket longitudinally with respect to said jacket and laid substantially straightly;
    said wefts woven with said warps by being laid in a bent configuration; said warps and wefts being woven such that, when said jacket is turned inside out for insertion into said pipe, an expansion in diameter of said jacket is possible when bent portions of said wefts become straightened.

* * * * *